United States Patent [19]

McCrae et al.

[11] 4,152,324
[45] May 1, 1979

[54] PIGMENT COPPER COMPLEX OF CARBOXYPHENYLAZON-PHENYL-β-NAPHTHYZAMINE

[75] Inventors: James M. McCrae, Stewarton; Christopher Midcalf, Kilbarchan, both of Scotland; Alexander M. Irvine, Paisley, England

[73] Assignee: Ciba-Geigy Corporation, Ardsley, N.Y.

[21] Appl. No.: 713,473

[22] Filed: Aug. 11, 1976

Related U.S. Application Data

[63] Continuation of Ser. No. 507,018, Sep. 18, 1974, abandoned.

[30] Foreign Application Priority Data

Sep. 22, 1973 [GB] United Kingdom ............... 44557/73

[51] Int. Cl.$^2$ ...................... C09B 45/14; C09B 45/18; C09B 45/22; C09B 45/28
[52] U.S. Cl. ..................................... 260/151; 106/22; 106/23; 106/288 Q; 260/147; 260/148; 260/149; 260/196
[58] Field of Search ........................ 260/149, 150, 151

[56] References Cited

U.S. PATENT DOCUMENTS

| B 383,697 | 2/1976 | Lienhard et al. | 260/147 |
| 1,835,821 | 12/1931 | Straub et al. | 260/151 |
| 3,562,246 | 2/1971 | Barwick | 260/149 |

FOREIGN PATENT DOCUMENTS

| 670142 | 9/1963 | Canada | 260/151 |
| 367584 | 4/1963 | Switzerland | 260/151 |
| 471199 | 5/1969 | Switzerland | 260/149 |
| 436588 | 10/1935 | United Kingdom | 260/151 |
| 1004059 | 9/1965 | United Kingdom | 260/151 |

OTHER PUBLICATIONS

Kuhn et al., Chemical Abstracts, vol. 44, 157 to 158, (1950).

Primary Examiner—Floyd D. Higel
Attorney, Agent, or Firm—Michael W. Glynn; Vincent J. Cavalieri

[57] ABSTRACT

A metal complex having the formula

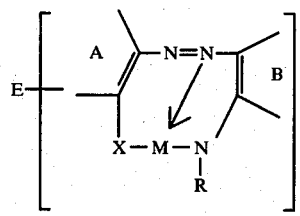

I or the formula

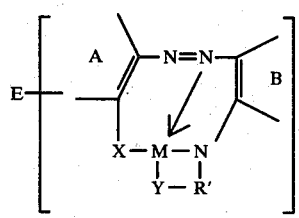

II wherein A is an aryl or heterocyclic residue, B is an aliphatic, aryl or heterocyclic residue, R is an alkyl, cycloalkyl, aryl, aralkyl or heterocyclic residue or R is the atoms required to complete, together with residue B, a heterocyclic residue, R' is a carbon chain which may form part of an aromatic or heterocyclic ring and containing 2 or 3 carbon atoms between the nitrogen atom and the substituent Y, X and Y are the same or different and each is $O, S, N, CO_2$ or N—R wherein R has its previous significance, M is Cu, Zn or ni, p is 1 or 2 and when p is 1, E is a hydrogen atom attached to one of residue A, B, R of R', and when p is 2, E is either a direct bond linking two residues, A, B, R or R' or is an alkylene, arylene or aralkylene residue linking two residues, A, B, R or R', which is useful for pigmenting organic material, preferably a lacquer, paint or printing ink.

1 Claim, No Drawings

PIGMENT COPPER COMPLEX OF CARBOXYPHENYLAZON-PHENYL-β-NAPH-THYZAMINE

This is a continuation of application Ser. No. 507,018, filed on Sept. 18, 1974 now abandoned.

The present invention relates to new pigments and, in particular, to new metal azo pigments ant to processes for producing these pigments.

According to the present invention, there is provided a metal complex having the formula:

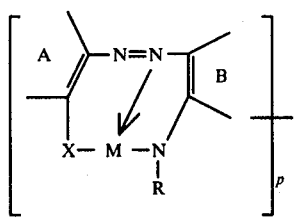

I or the formula

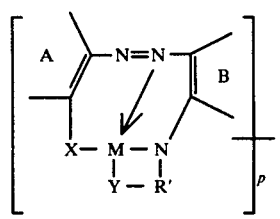

II wherein A is an aryl or heterocyclic residue; B is an aliphatic, aryl or heterocyclic residue; R is an alkyl, cycloalkyl, aryl, aralkyl or heterocyclic residue or, R is the atoms required to complete together with residue B, a heterocyclic residue R' is a carbon chain which may form part of an aromatic or heterocyclic ring, having from 2 to 3 carbon atoms, between the nitrogen atom and the substituent Y; X and Y are the same or different and each is O, S, N, $CO_2$ or N—R wherein R has its previous significance; M is a Cu, Zn or Ni metal atom; p is 1 or 2; and when p is 1, E is a hydrogen atom attached to one of the residue A, B, R and when p is 2, E is either a direct bond linking two residues A, B, R and R' or is an alkylene, arylene or aralkylene residue linking two residues A, B, R or R'.

A preferred group of metal complexes according to the invention have the formula:

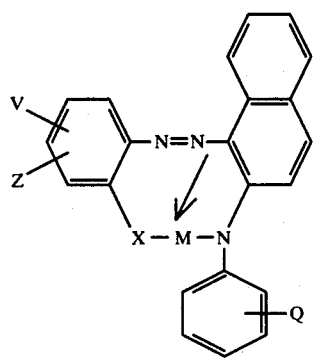

wherein X and M have their previous significance and V, Z and Q are the same or different and each is a hydrogen, nitro or alkyl or alkoxy residue having from 1 to 4 carbon atoms.

When A and/or B is an aryl residue, the latter preferably contains from 6 to 14 carbon atoms and may consist of a single aromatic ring or two or more fused aromatic rings. The aryl residue may be unsubstituted or substituted with one or more groups which do not impart water-solubility to the complex compound of formula I or II, for instance alkyl, alkoxy, carboxyalkyl or alkylcarbamoyl groups, each having from 1 to 4 carbon atoms in the alkyl moiety, arylcarboxyarylamide, arylcarbamoyl groups, nitro groups or halogen atoms. Preferred examples of aryl residues A and/or B are phenyl and naphthyl residues.

When A and/or B is a heterocyclic residue, it may be either unsubstituted or substituted with one or more of the non-water-solubilising groups disclosed hereinbefore. Preferred heterocyclic residues A and/or B are pyrazol-5-one residues.

When B is an aliphatic residue it may be the residue of any aliphatic coupling component which is capable of coupling with a diazonium salt. The preferred aliphatic residue B is 1-methyl-2(anilinocarbonyl)-ethylene residue or a derivative thereof.

R is a monovalent and may be an alkyl residue having from 1 to 20 carbon atoms, preferably from 1 to 12 carbon atoms such as methyl, ethyl, propyl, butyl, hexyl, octyl, decyl or dodecyl residue; a cycloalkyl residue having 5 or 6 carbon atoms; an aryl residue having from 6 to 14 carbon atoms such as a phenyl or naphthyl residue; an aralykl residue having from 7 to 12 carbon atoms, especially a benzyl residue, or a heterocyclic residue such as a pyrazol-5-one residue.

R' is a divalent group and may be saturated or unsaturated. For instance, R' may be a 1,2-ethylene, 1,2- or 1,3-propylene, allyl or methallyl residue. Alternatively, R' may form part of an aromatic or heterocyclic ring, for example R' and substituent Y may each form part of a quinoline ring.

Preferably, p is 1 and E is a hydrogen atom attached to one of the residues A, B, R, and R'.

However, when p is 2, then either E is a direct bond linking two residues e.g. phenylene or biphenylene residues A, B, R or R' or E is an alkylene, arylene or aralkylene residue linking two residues A, B, R or R'.

Specific classes of compounds of formula I or II of particular interest are those having the formulae:

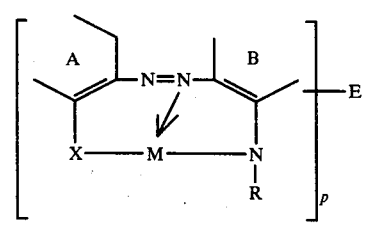

Class (1)

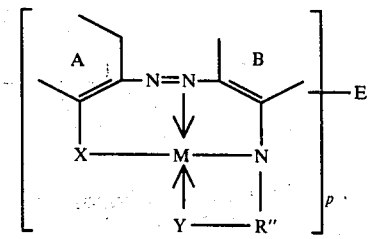

Class (2)

-continued
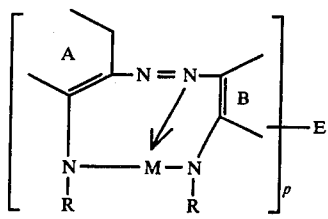
Class (3)
Examples of sub-groups of compounds within class (1) are those having the formula:
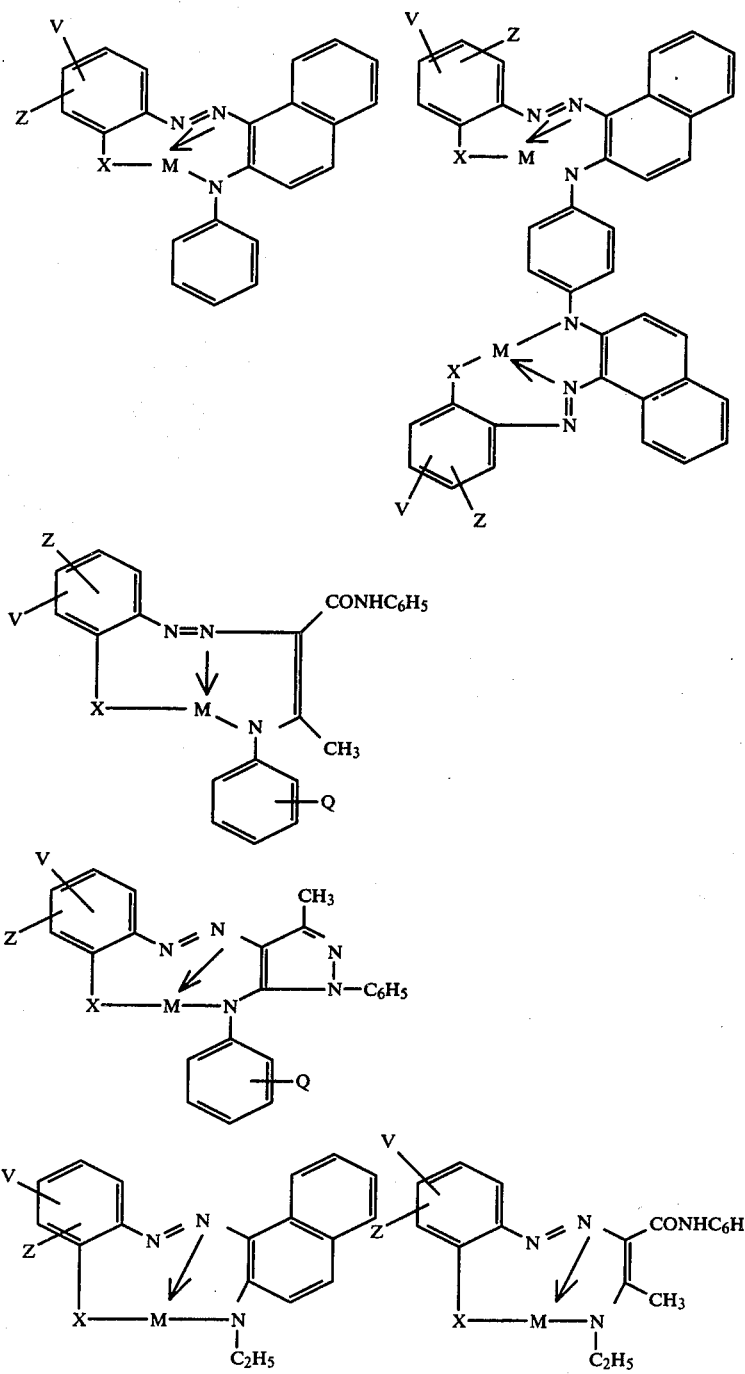
An Example of a sub-group of compounds within class (2) is that having the formula

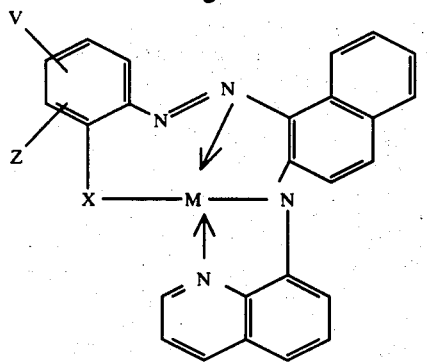

An example of a sub-group of compounds within class (3) is that having the formula

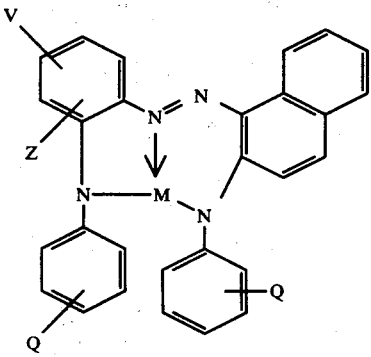

In each of the foregoing formulae, A, B, R, R', X, Y, M, E, p and n have their previous significance.

The present invention also provides a process of producing a compound of formula I or II comprising metallising a compound having the formula:

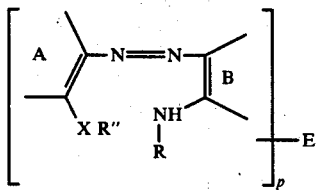

III or the formula

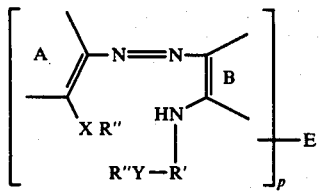

IV wherein A, B, R, R', X, C, p and Y have their previous significance and R" is hydrogen or a methyl residue.

The metallisation of the compound of III or IV may be carried out directly in the reaction medium used to produce the compound of formula III or IV. Alternatively, the compound of formula III or IV be separated from its crude reaction mixture, washed free from impurities and re-suspended prior to metallisation, in a solvent which may be the same as or different from any solvent used to produce the compound of formula III or IV.

The metallisation may be effected using a solution or suspension of any suitable salt or complex of the metal M. For instance, when the metallisation is a coppering process, a suspension of a copper salt in an organic solvent or an aqueous solution of a copper salt such as copper acetate, cuprammonium sulphate or sodium cuprotartrate may be used. In the case of metallisation with zinc, an aqueous or an organic solution of a zinc salt such as zinc sulphate may be used. When the metallisation is effected using nickel, it is convenient to use a solution of nickel acetate tetrahydrate in methyl cellosolve.

Many of the compounds of formula III and IV are new compounds per se, and may be obtained by methods known per se.

The compounds of formula III and IV may be produced, for instance by coupling the diazo compound of an amine of formula:

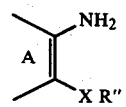

V with a compound of formula:

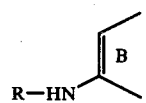

VI or formula:

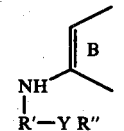

VII wherein A, B, X, Y, R, R' and R" have their previous significance.

The reaction is conveniently effected under known coupling conditions.

The starting-materials of formulae VI and V are well-known per se.

Coupling components of Formula VI suitable for use in the present invention include
N-phenyl-β-naphthylamine
N-(2-thiophenyl)-β-naphthylamine
N-(2-ethylaminophenyl)-β-naphthylamine
N-phenyl-3(anilino)-but-2-enoic acid amide
1-phenyl-3-methyl-5-anilino-pyrazole
N-phenyl-3-ethyl-but-2-enoic acid amide
N-(8-quinolinyl)-β-naphthylamine
N,N'-di-(2-naphthyl)-o-phenylene diamine As example of amines of formula V suitable for use in the present invention these may be mentioned:
anthranilic acid
2-hydroxy aniline
2-methoxy aniline
2-hydroxy-5-chloroaniline
2-methoxy-5-chloroaniline
2-hydroxy-4-nitroaniline
2-methoxy-4-nitroaniline
2-methoxy-4-nitro-5-methyl aniline
8-aminoquinoline
lactam of 2-(carboxymethoxy)-5-chloroaniline lactam of 2-(carboxymethylthio)-aniline
lactam of 2(carboxymethoxy)aniline Because of their insolubility in the reaction medium, the compounds of formula I and II can easily be isolated from the reaction mixture filtration.

The compounds of formula I and II may be employed as pigments directly after production; that is after they have been filtered off from their crude reaction liquors and dried. Alternatively, they may be first processed using known wet or dry conditioning techniques such as grinding, either alone or in the presence of a water-soluble salt or other medium which can be subsequently removed, for instance by washing.

Accordingly, the present invention further provides a method of colouring organic material comprising incorporating into the organic material a minor proportion of a compound of formula I or II. The present invention also includes organic material so coloured.

The proportion of the compound of formula I or II employed to colour organic material according to the invention may be varied within a wide range, but is normally within the range of from 0.1%, to 10%, preferably from 0.5% to 5% by weight based on the total weight of organic material to be coloured.

Organic materials which may be coloured according to the invention include high molecular organic material, for example, cellulose ethers and cellulose esters such as ethyl cellulose, acetylcellulose and nitrocellulose, polyamides, polyurethanes and polyester, natural and synthetic resins such as aminoplasts, especially urea-formaldehyde and melamine-formaldehyde resins, alkyl resins, phenoplasts, polycarbonates, polyolefines such as polystyrene, polyvinyl chloride, polyethylene, polypropylene, polycrylonitrile, polyacrylic acid esters, rubber, casein, silicone and silicone resins, individually or in admixture. It does not matter whether these high molecular compounds are in the form of plastic masses or melts or in the form of spinning solutions. The compounds of formula I and II are of particular interest, however, for the colouration of lacquers, paints and printing inks.

Depending upon the end use, it may be advantageous to employ the compounds of formula I or II as a toner or in the form of a pigment preparation.

As a rule, the compounds of formula I and II are characterized by excellent weather-, light- and solvent fastness properties and high colour strength.

Some Examples will now be given, in which parts and percentages are by weight.

Preparation of Ligands

EXAMPLE 1

41.1 Parts of anthranilic acid were stirred into a mixture of 91.4 parts of concentrated hydrochloric acid and 100 parts of cold water, the mixture was cooled to 0°-5° C. and maintained at this temperature whilst a solution of 20.7 parts of sodium nitrite in 40 parts of water was added to the mixture. The diazonium solution so obtained was added over 15 minutes to a cold solution of 65.7 parts of N-phenyl-β-naphthylamine in 633 parts of ethanol. During the coupling, 600 parts of water mixed with 745 parts of ethanol were added to prevent the suspension becoming too thick. The red suspension was stirred for 1 hour, filtered the solid material with aqueous ethanol and dried at 55° C. In this way, there were obtained 96.1 parts of a red-orange solid having a melting-point of 224.5° C. and having the structure:

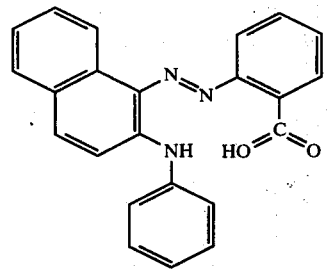

The elemental analysis of the compound was as follows:

|  | C | H | N |
|---|---|---|---|
| $C_{23}H_{17}N_3O_2$ requires | 75.20 | 4.63 | 11.44% |
|  | 74.75 | 4.80 | 11.09% |

18.4 Parts of the product of Example 1, as a paste before drying, were mixed with high-speed stirring into 400 parts of cold water containing 0.15 part of Solumin FIOS (the sodium salt of sulphonated alkyl phenoxy polyethoxy ethanol). 20.4 Parts of sodium acetate trihydrate were then added followed by 13.74 parts of copper sulphate pentahydrate dissolved in 50 parts of water. The temperature of the suspension was raised to 95° C. by injection of steam and held at 95° C., with stirring, for 3 hours. The suspension obtained was filtered hot, washed with hot water free from sulphate and dried at 70° C. In this way, there were obtained 20.2 parts of a maroon melting above 300° C.

EXAMPLES 2 to 15

Using the procedure described above, the amines and the coupling components shown in the following Table I were reacted to produce the corresponding compound of formula II.

TABLE I

| EXAMPLE | AMINE | COUPLING COMPONENT | M.pt°C. | YIELD |
|---|---|---|---|---|
| 2 | (structure: aniline with CH₃ and COOH, NH₂) | (naphthyl-NH-phenyl) | 188–90 | 66 |
| 3 | (structure: aniline with O₂N and COOH, NH₂) | (naphthyl-NH-phenyl) | 227–0 | 71 |

TABLE I-continued

| EXAMPLE | AMINE | COUPLING COMPONENT | M.pt°C. | YIELD |
|---|---|---|---|---|
| 4 | 4-nitro-2-amino-benzoic acid (O$_2$N, NH$_2$, COOH on benzene) | N-phenyl-2-naphthylamine | 249–50 | 87 |
| 5 | 4,4'-methylenebis(2-aminobenzoic acid) | N-phenyl-2-naphthylamine | 283–5 | 96 |
| 6 | 2-aminophenol | N-phenyl-2-naphthylamine | 151–2 | 95 |
| 7 | 2-amino-anisole (NH$_2$, OCH$_3$) | N-phenyl-2-naphthylamine | 150–1 | 95 |
| 8 | 4-chloro-2-amino-phenol (Cl, NH$_2$, OH) | N-phenyl-2-naphthylamine | 186–7 | 80 |
| 9 | 4-chloro-2-amino-anisole (Cl, NH$_2$, OCH$_3$) | N-phenyl-2-naphthylamine | 174–5 | 93 |
| 10 | 4-nitro-2-amino-phenol (O$_2$N, NH$_2$, OH) | N-phenyl-2-naphthylamine | — | — |
| 11 | 4-nitro-2-amino-anisole (O$_2$N, NH$_2$, OCH$_3$) | N-phenyl-2-naphthylamine | 212–3 | 96 |
| 12 | 5-methyl-4-nitro-2-amino-anisole (H$_3$C, NH$_2$, O$_2$N, OCH$_3$) | N-phenyl-2-naphthylamine | 202–3 | 84 |
| 13 | 8-aminoquinoline | N-phenyl-2-naphthylamine | 158–60 | 88 |
| 14 | 4-nitro-2-amino-anisole (O$_2$N, NH$_2$, OCH$_3$) | N-phenyl-2-naphthylamine | 258–9 | 88 |
| 15 | 4-chloro-2-amino-phenol (Cl, NH$_2$, OH) | N-phenyl-2-naphthylamine | 98–9 | 61 |

Preparation of metal complexes

EXAMPLES 16

73.4 Parts of the product of Example I were dissolved in 1400 parts of hot methyl cellosolve and to this was added a solution of 40 parts of cupric acetate monohydrate dissolved in 572 parts of dimethyl formamide followed by 1400 parts of methyl cellosolve. The resulting red suspension was refluxed for 4 hours, filtered hot and the solid washed with 500 parts of hot methyl cellosolve, followed by ethanol, and dried. Thus were obtained 68.5 parts of a maroon solid of melting point not less than 300° C. and having the formula

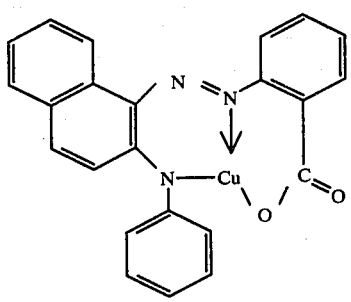

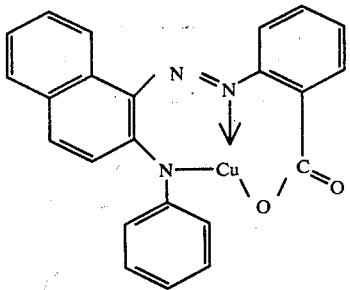

EXAMPLES 17 to 49

Using the procedure described in Example 16, the compounds of formula I shown in the following Table II were prepared from the corresponding coupling components and amines also shown in Table II.

EXAMPLES 17 to 49

Using the procedure described in Example 16, the compounds of formula I shown in the following Table II were prepared from the corresponding coupling components and amines also shown in Table II.

TABLE 2

| Example | Ligand | Product | Colour in Lacquer |
|---|---|---|---|
| 17 | (naphthalene-phenylamino-azo-methylphenyl-COOH ligand) | (Cu complex of ligand 17) | Bordeaux |
| 18 | (naphthalene-phenylamino-azo-methylphenyl-COOH ligand) | (Ni complex of ligand 18) | Green |
| 19 | (naphthalene-phenylamino-azo-nitrophenyl-COOH ligand) | (Cu complex of ligand 19) | Maroon |

TABLE 2-continued

| Example | Ligand | Product | Colour in Lacquer |
|---|---|---|---|
| 20 | [ligand structure: naphthalene with N=N linked to nitrophenyl-COOH, and NH-phenyl] | [Ni complex structure] | Black |
| 21 | [ligand structure] | [Cu complex structure] | Red |
| 22 | [ligand structure] | [Ni complex structure] | Green |

TABLE 2-continued
| Example | Ligand | Product | Colour in Lacquer |
|---|---|---|---|
| 23 | 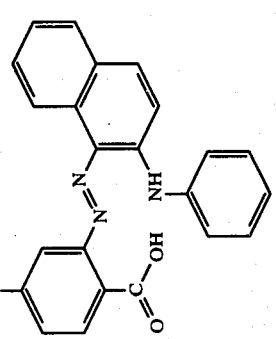 | 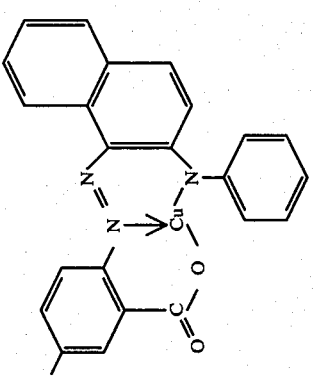 | Red |
| 24 | 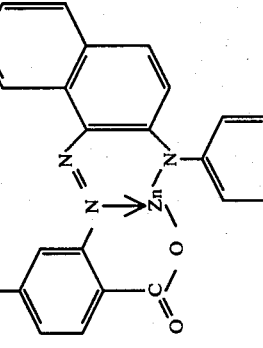 | 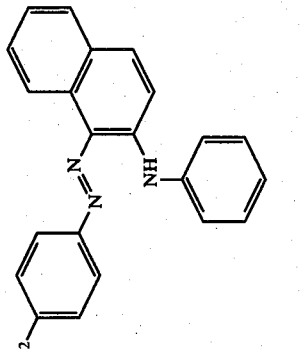 | bright Violet |
| 25 | 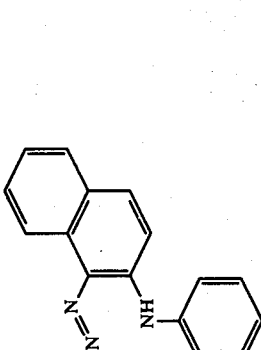 | 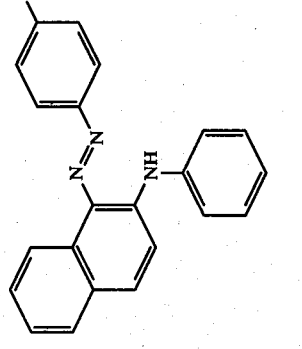 | maroon |

TABLE 2-continued

| Example | Ligand | Product | Colour in Lacquer |
|---|---|---|---|
| 26 | [naphthalene with N=N to 2-methoxyphenyl and NH-phenyl] | [Ni complex of ligand 26 with phenoxide O] | maroon |
| 27 | [naphthalene with N=N to 5-chloro-2-hydroxyphenyl and NH-phenyl] | [Cu complex] | deep violet |
| 28 | [naphthalene with N=N to 2-methoxyphenyl and NH-phenyl] | [Ni complex with phenoxide O] | light violet |

TABLE 2-continued

| Example | Ligand | Product | Colour in Lacquer |
|---|---|---|---|
| 29 | [2-(phenylamino)-1-(5-chloro-2-hydroxyphenylazo)naphthalene ligand] | [Zn complex] | red |
| 30 | [2-(phenylamino)-1-(5-chloro-2-methoxyphenylazo)naphthalene ligand] | [Cu complex] | violet |
| 31 | [2-(phenylamino)-1-(5-chloro-2-methoxyphenylazo)naphthalene ligand] | [Ni complex] | red |

TABLE 2-continued

| Example | Ligand | Product | Colour in Lacquer |
|---|---|---|---|
| 32 | 1-(5-chloro-2-methoxyphenylazo)-2-phenylamino-naphthalene | Zn complex of 1-(5-chloro-2-hydroxyphenylazo)-2-phenylamino-naphthalene | red |
| 33 | 1-(4-nitro-2-hydroxyphenylazo)-2-phenylamino-naphthalene | Cu complex of 1-(4-nitro-2-hydroxyphenylazo)-2-phenylamino-naphthalene | blue |
| 34 | 1-(4-nitro-2-hydroxyphenylazo)-2-phenylamino-naphthalene | Ni complex of 1-(4-nitro-2-hydroxyphenylazo)-2-phenylamino-naphthalene | deep violet |

TABLE 2-continued

| Example | Ligand | Product | Colour in Lacquer |
|---|---|---|---|
| 35 | [naphthalene-azo-(4-nitro-2-hydroxyphenyl), with NH-phenyl ligand] | [Zn complex] | blue |
| 36 | [naphthalene-azo-(4-nitro-2-methoxyphenyl), with NH-phenyl ligand] | [Cu complex] | blue |
| 37 | [naphthalene-azo-(4-nitro-2-methoxyphenyl), with NH-phenyl ligand] | [Ni complex] | deep violet |

TABLE 2-continued

| Example | Ligand | Product | Colour in Lacquer |
|---|---|---|---|
| 38 | [naphthalene-N=N-(5-CH₃, 2-OCH₃, 4-O₂N-phenyl), with NH-phenyl] | Cu complex of ligand (with O replacing OCH₃) | blue |
| 39 | [naphthalene-N=N-(5-CH₃, 2-OCH₃, 4-O₂N-phenyl), with NH-phenyl] | Ni complex of ligand (with O replacing OCH₃) | deep blue |
| 40 | [naphthalene-N=N-(2-N-naphthyl), with NH-phenyl] | Cu complex of ligand | bright blue-red |

TABLE 2-continued

| Example | Ligand | Product | Colour in Lacquer |
|---|---|---|---|
| 41 | (naphthyl-N=N-C₆H₄-NH-phenyl with naphthyl-N ligand) | Ni complex | green |
| 42 | (naphthyl-N=N-C₆H₄-NH-phenyl with naphthyl-N ligand) | Zn complex | red (sl.blue) |
| 43 | (O₂N-C₆H₃(OCH₃)-N=N-naphthyl-NH-C₆H₄-Cl) | Cu complex | Purple |

TABLE 2-continued

| Example | Ligand | Product | Colour in Lacquer |
|---|---|---|---|
| 44 | (structure) | (structure) | dark red |
| 45 | (structure) | (structure) | dark red. |
| 46 | (structure) | (structure) | bordeaux |

TABLE 2-continued

| Example | Ligand | Product | Colour in Lacquer |
|---|---|---|---|
| 47 | naphthalene-N=N-NH-C₆H₄ with OH and H₃CS substituents | Cu complex of ligand 47 (with O→Cu and S→Cu coordination) | red |
| 48 | naphthalene-N=N-NH-C₆H₄ with OH and H₃CO substituents | Cu complex of ligand 48 (with O→Cu and O→Cu coordination) | bluish red |
| 49 | naphthalene-N=N-C₆H₄(NH-phenyl) with NH-cyclohexyl substituent | Cu complex of ligand 49 (with N→Cu coordination, phenyl and cyclohexyl groups) | red |

EXAMPLE 50

(a) 20.55 parts anthranilic acid are stirred into 65 parts water at room temperature for 5 minutes. 37.5 parts concentrated hydrochloric acid are added dropwise, giving a thick slurry which is stirred a further 5 minutes before the addition of 25 parts of ice to lower the temperature to 0° C. with the aid od external cooling before the addition of 10.35 parts of sodium nitrite dissolved in 25 parts of water over 5 minutes. The volume of the diazo solution was adjusted to 250 parts with water.

34.5 parts of N-phenyl-β-naphthylamine are stirred into 400 parts of ethylene glycol containing 1.73 parts Lissapol NX (a commercial surfactant). A further 100 parts of ethylene glycol was added and the suspension was stirred at room temperature for 30 minutes then raised to 40° C. using a steam poker. To this suspension is added the diazo solution over 15 minutes and the suspension stirred at 40° C. for a further 2 hours.

To the red suspension is added 18 parts of sodium hydroxide in 50 parts of water and stirred for 30 minutes to yield a deep red solution which is then filtered to remove unreacted N-phenyl-β-naphthyl-amine and the filtrate is washed with a solution of 20 parts sodium hydroxide in 50 parts of water. The volume of the filtrate is brought to 1,500 parts using water.

This solution of ligand can now be metallised using either of the following methods or the ligand may itself be isolated by acidification, filtering, washing and drying and then used to form the metal complex.

(b) 2.78 parts of the sodium salt of ε naphthalene sulphonic acid-formaldehyde condensate are added to the solution of ligand prepared in Example 49 (a) and the solution stirred at high speed using a Silverson stirrer. To the solution is added 15 parts of glacial acetic acid in 15 parts of water over 10 minutes to yield a thick red slurry. To the suspension is added 40.8 parts of sodium acetate trihydrate dissolved in 50 parts water and stirred for 10 minutes. After this time, 37.5 parts of copper sulphate pentahydrate dissolved in 100 parts of water are added over 5 minutes and the temperature then raised to 95° C. over 20 minutes using steam. The temperature is held at 95° C. for 90 minutes then boiled for 30 minutes. The resultant maroon slurry is filtered hot, washed sulphate free and dried at 50°-60° C. In this way was obtained 64.3 parts of a maroon solid of melting point not less than 360° C.

EXAMPLE 51

To the solution obtained from Example 49 (a) was added 2.78 parts of the sodium salt of a naphthalene sulphonic acid/formaldehyde condensate and the solution stirred at high speed using a Silverson stirrer. To this solution is added 37.5. parts of copper sulphate pentahydrate dissolved in 100 parts water and 39 parts of concentrated ammonia hydroxide (D=0.88). The mixture was stirred for 10 minutes then 15 parts glacial acetic acid in 15 parts water are added over 10 minutes then the red suspension heated to 95° C. over 20 minutes and held at this temperature for 90 minutes then boiled for a further 30 minutes. The thick maroon slurry was filtered hot, washed sulphate free and dried to yield 61.5 parts of a maroon solid with melting point not less than 360° C.

EXAMPLE 52

20.55 parts of anthranilic acid are stirred into 65 parts of water and 23 parts of concentrated sulphuric acid are added dropwise, external cooling being used to lower the temperature to 0° C. before the addition of 10.35 parts of sodium nitrite dissolved in 25 parts of water over 10-15 minutes, giving a brown solution which is treated with charcoal powder and filtered through Supercel. The volume of the solution is adjusted to 450 parts.

34.5 parts of N-phenyl-β-naphthylamine are added to 113 parts of 80% aqueous acetic acid. 31.8 parts of concentrated sulphuric acid are added dropwise to give a dark brown solution at 40°-50° C. This temperature is maintained during the addition of the coupling component solution simultaneously with the diazonium salt solution to a coupling bath containing 25.8 parts of Nansa SSA (a commercial dodecyl benzene sulphonic acid) dissolved in 3,00 parts of water at 40°-50° C. When the additions are complete, the red slurry is stirred for a further 1 hour. The slurry was then used to prepare metal complexes using the method described in Example 49 or 50.

We claim:
1. The compound of the formula

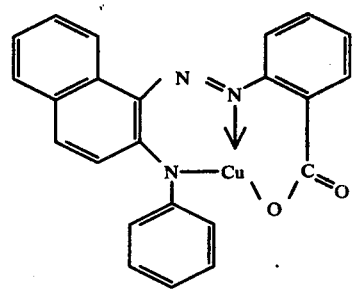

* * * * *